May 21, 1935. T. DE ROODE Re. 19,586

SLEEPING CAR

Original Filed June 13, 1924 2 Sheets-Sheet 1

INVENTOR
Trimble de Roode.
BY Gustav Drews
ATTORNEY

May 21, 1935. T. DE ROODE Re. 19,586

SLEEPING CAR

Original Filed June 13, 1924 2 Sheets-Sheet 2

INVENTOR
Trimble de Roode
BY Gustav Drews
ATTORNEY

Reissued May 21, 1935

Re. 19,586

UNITED STATES PATENT OFFICE 19,586

SLEEPING CAR

Trimble de Roode, New York, N. Y.

Original application June 13, 1924, Serial No. 719,772. Divided and application April 18, 1930, Serial No. 445,369. Patent No. 1,859,730, dated May 24, 1932. Application for reissue August 25, 1933, Serial No. 686,810

43 Claims. (Cl. 105—315)

This invention relates to sleeping cars in general, and more especially to standard sleeping cars having the open berth sections, and constitutes the subject matter of an application for a reissue of Patent No. 1,859,730 which resulted from application, Serial No. 445,369 filed April 18, 1930 and which was a division of my copending application, Serial No. 719,772 filed June 13, 1924.

Among the objects of the present invention it is aimed to afford greater individual privacy for the upper and lower berths, and to facilitate access to the upper berths. To the aforesaid ends, the present invention more specifically contemplates an arrangement of curtains with the standard open berth sections, whereby the occupants of the upper berths while dressing or undressing behind their curtains are positioned outside of the curtains of the lower berths and vice versa, whereby the occupants of the lower berths while dressing or undressing behind their curtains are positioned outside of the curtains of the upper berths.

The present invention further contemplates the provision of means whereby the occupants of the upper and lower berths of a section may simultaneously be dressing or undressing while adjacent to their berths without intruding upon one another's privacy.

The present invention still further contemplates an arrangement of curtains for the upper and lower berths whereby the portion of curtain for an upper berth disposed behind the curtain for the lower berth is secured at the lower extremity to insure the privacy of the occupants of the upper berth, and similarly, the portion of the curtain of the lower berth disposed behind the curtain of the upper berth is secured adjacent to the lower edge of the upper berth, to insure the privacy of the occupant of the lower berth.

As another object of the present invention, it is aimed to provide standing room or head room where the occupant of the lower berth may stand erect outside of the lower berth without intruding upon the privacy of the occupant of the upper berth, and similarly, to provide standing room or leg room where the occupant of the upper berth may stand erect outside of the upper berth without intruding upon the privacy of the occupant of the lower berth.

More specifically, the present invention contemplates, the provision of an individual step formation for each upper berth which preferably forms a permanent part of the car and may be moved into operative position for use throughout the night. To this end, the step formation may be variously arranged such for instance as equipped with a projection disposed below a recess formed in the lateral side supporting section and an auxiliary upper portion having projections disposed below recesses to form steps.

These and other features, capabilities and advantages of the invention will appear from the subjoined detail description of certain embodiments of the present invention illustrated in the accompanying drawings, in which Figure 1 is a fragmental longitudinal section of a car equipped with one form of the present invention.

Figure 1:
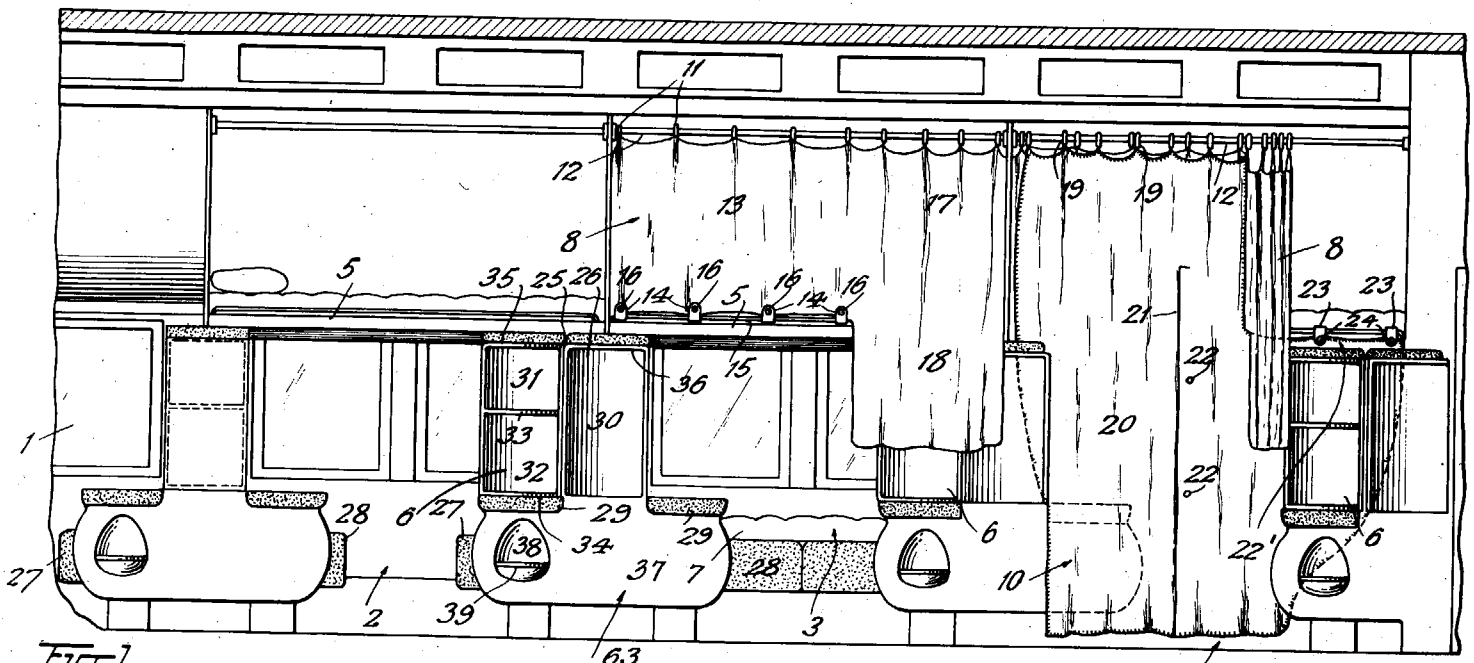
Figure 2:
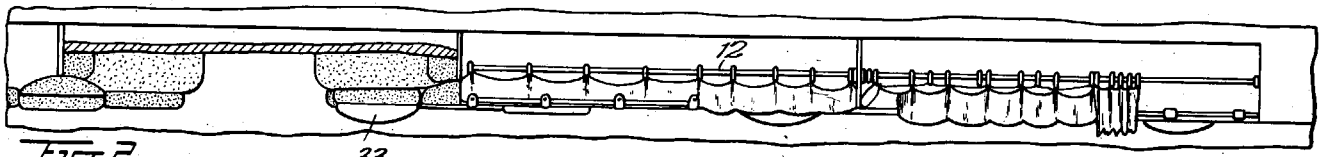
Fig. 2 is a fragmental plan of the modification illustrated in Fig. 1.

The embodiment illustrated in Figs. 1 and 2 is shown as used with a standard car having upper and lower berth sections showing four sections 1, 2, 3 and 4, section 1 being partly broken away.

Since the several sections are substantially identical with one another, homologous parts will be designated by the same reference character, and to facilitate an understanding of the invention, the several sections are shown in different stages of conversion from day use to night use, which on account of the identity of the several sections, will at the same time, illustrate the different stages of conversion from day use to night use of each section, section 1 for instance, being entirely closed up ready for day use; section 2 having only the upper berth 5 opened up ready for night use without hanging up the curtains, and the step containing housing 6 swung out into opened position ready for night use; section 3 having both the upper and lower berths 5 and 7 respectively, opened up ready for night use with the upper curtain 8 for the upper berth 5 of such section hung up in place ready for night use, and the step containing housing 6 of such section swung out into opened position ready for night use; and section 4 having both the upper berth 5 and the lower berth 7 opened out ready for night use with the upper curtain 8 for the upper berth 5 and the lower curtain 10 for the lower berth 7 of said section both hung up ready for night use, and the step containing housing 6 of such section swung out ready for night use. In such outwardly swung position, the housing 6, of course, forms a partition between the lower berths and the space or room where the legs of a user may be positioned when standing on the steps of such housing 6, the housing 6 thus forming a leg room for the occupant of the upper berth. From the foregoing, it will thus clearly appear that the lower and upper compartments may simultaneously be maintained and used in different stages of conversion according to the use intended for the same and that the users of the respective compartments and of the aisle may thus be fully and adequately protected and protected from one another and from users of the aisle.

With the modification illustrated in Figs. 1 and 2, it is thus seen that the upper and lower berths of the standard sleeping car in use today will remain practically unaltered, the invention relating more or less directly to the curtains and the provision of a step formation for gaining access to the upper berths.

With respect to the arrangement of curtains, the invention contemplates using one portion of the curtain of each berth as a division or partition between such berth and the standing room or leg room for the other berth, and using the other portion of the curtain as the door flap for such berth. To this end the invention specifically contemplates providing securing means for securing one portion of the curtain for a berth to the upper and lower edges of a berth to form the partition, and providing securing means for securing the other portion of the curtain merely at the upper end of such curtain, so that the lower end of such portion may hang loosely and form the door flap for such berth.

As an instance, the upper curtain 8 is substantially L shaped as shown in Fig. 1, and is provided with the usual hooks 11 at its upper edge to engage the supporting rod 12 extending longitudinally of the car, and at the upper ends of the upper berths 5. The partition forming portion of the curtain 8 is the narrow strip 13, and is provided with a suitable fastening means at its lower edge preferably as illustrated, the loops 14 which are bent around the rod 15 secured to the outer edge of the upper berth 5 and fastened in place by suitable buttons 16. The partition portion 13 as a rule extends over a half or a little more than a half of the berth. The other portion of the curtain 17 is not secured at its lower edge but is preferably provided with an extending portion 18 hanging below the lower edge of the upper berth and part way over the lower berth, to provide a leg covering for the occupant of the upper berth when dressing or undressing, the unsecured portion in addition thereto serving to facilitate the folding back of this portion 17 when used as a door flap during the entrance or egress of the occupant.

The curtain 10 for the lower berth is also provided with hooks at its upper end as for instance the hooks 19 which are secured to the supporting rod 12, but with the curtain 10, only a portion of the upper edge of the curtain 10 is provided with the hooks 19, which portion for convenience of description may be designated as the door flap portion 20 which hangs loosely down over the lower berth, and is preferably provided with a slit 21 preferably provided with suitable securing means such as the buttons 22 and suitable button holes whereby the opposing edges of the slit 21 may be buttoned together to close the upper flap when desired. The curtain 10 has a lateral extension 22′ which extends below the lower edge of the upper berth 5 over which the portion 18 of the upper curtain 8 overlaps and this extension 22′ is preferably provided with hooks 23 at its upper edge to be secured to and bent around the rod 15 and fastened in place by suitable buttons 24, such extension 22′ forming the partition for the lower berth, spacing the lower berth from the leg room for the upper berth. This extension 22′, as illustrated in Fig. 1, preferably extends inside of the step containing housing 6. From the foregoing it will be seen that each curtain forms a partition and a door flap, the curtain 8 having the partition portion 13 separating the upper berth from the head room for the occupant of the lower berth disposed between the partition portion 13 and the door flap portion 20 of the curtain 10, and the curtain 10 having the partition portion 22′ forming leg room for the occupant of the upper berth spacing the lower berth from such leg room, disposed between the partition portion 22′ and the door flap portion 18 of the upper curtain 8.

The step containing housing 6 in the present instance resembles a door member which is pivoted or hinged along one edge as at 25 to one edge of the lateral upright end portion 26 disposed at the lateral edge of the adjacent back rests of two adjacent seats 27 and 28. For the purpose of the present invention it is preferable to provide an end portion 26 that extends substantially to the lower edge of the upper berths 5 as illustrated in Fig. 1. This end portion 26 in the present instance is preferably recessed from its upper edge down to the level of the arm rests 29 as shown by the recess 30. The step containing housing 6 is provided with two recesses 31 and 32 each disposed above a step formation 33 and 34 whereby the step formations 33 and 34 extend inwardly into the recesses 31 and 32, affording a greater area as a foot support for the occupant of the upper berth, without forming an unduly extending step projection. The upper edge of the end portion 26 and the upper edge of the housing 6 are preferably provided with velvet edgings 35 and 36 for engagement with one another when the housing 6 is swung into closed position, to provide a dustproof closure and at the same time afford a sufficiently silent closure, and the velvet edging 35 is provided for yieldable engagement with the curtain extension 22′ or for silent engagement with the under edge of the upper berth 5 should the curtain extension 22′ be omitted.

Beyond one side of the end portions 26, and in the end board 37 of the seats 27 and 28, and preferably disposed below the position of the housing 6 when opened, there is formed a recess 38 and below the recess 38 a step projection 39, which extends partly outside of the recess 38 and beyond the end board 37, and partly into the recess 38 to form an extended supporting area as a foot support to form the first step of the step formation for the occupant of the upper berth.

Figures 3, 4, 5, 6, 7:
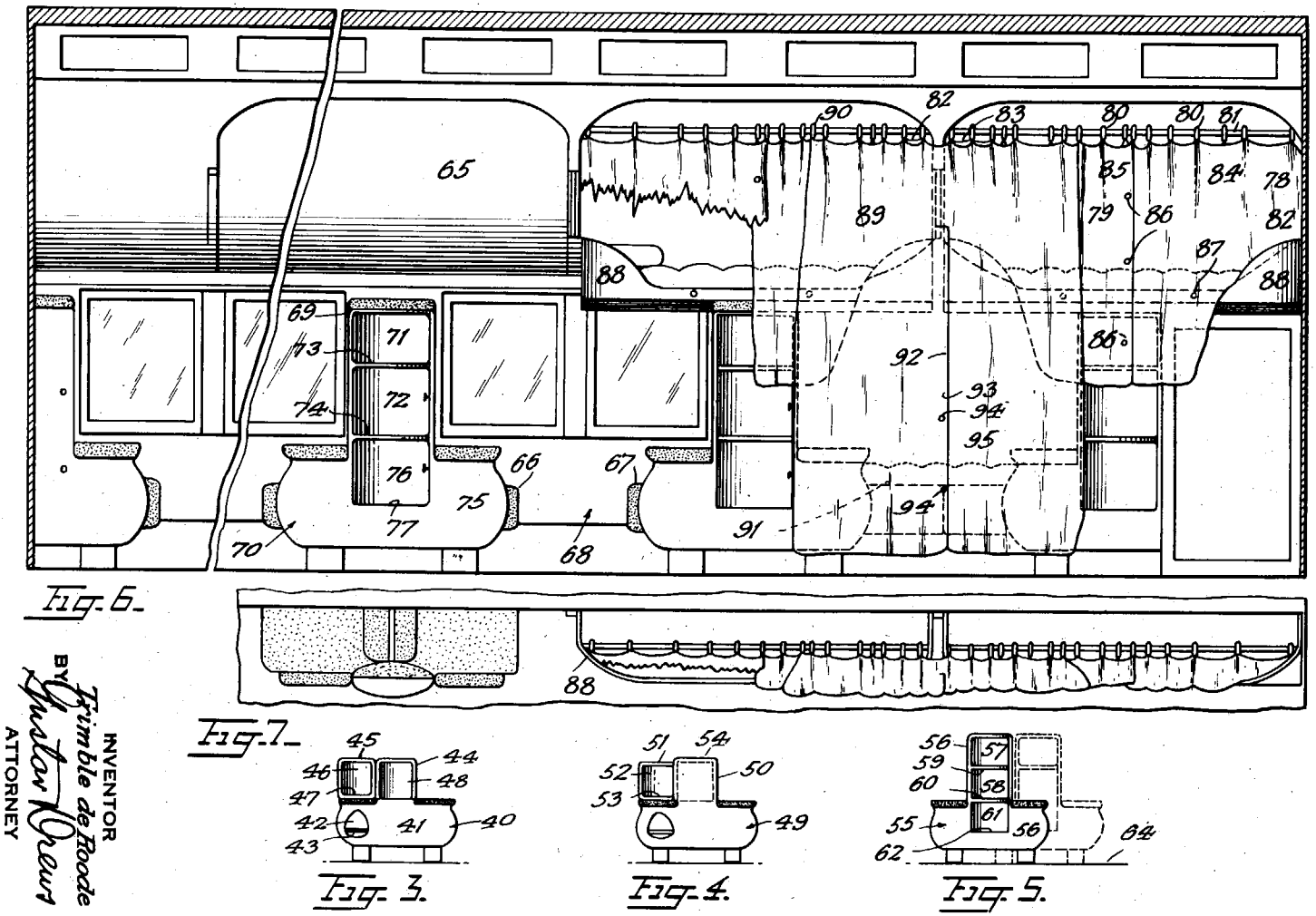
Figs. 3, 4 and 5 are modifications respectively of the step portions.
Fig. 6 is a fragmental longitudinal section of a car equipped with one form of the present invention.
Fig. 7 is a fragmental plan showing the modification illustrated in Fig. 6.

In Fig. 3, there is illustrated another end member generally designated by the reference character 40, the lower portion or end board 41 of which is substantially identical with the end board 37 of the end member 63 illustrated in Fig. 1, and is also provided with a recess 42 disposed above a step projection 43 substantially identical with the recess 38 and step projection 39 respectively of the modification illustrated in Fig. 1. Above the end board 41, however, the end portion 44 has a less altitude than the altitude of the end portion 26 and as illustrated, is substantially one-half the height of the end portion 26 or just high enough to afford the formation of a single step 47. This end portion 44 has pivoted thereto a step containing housing 45 which is recessed at 46 above the step formation 47, the step formation cooperating with the recess 46 to afford a greater supporting area for the foot of the occupant of the upper berth. The end portion 44 is provided with a recess 48 to receive the step portion 47 when the housing member 45 is swung into closed position, against the end portion 44.

In Fig. 4, still another form of end member is illustrated which is generally designated by the reference character 49. This end member 49 is substantially identical with the end member 40 having a low end portion 50 similar in height to the height of the end portion 44. In this modification, however, the step containing housing consists of a slidable member 51 provided with a recess 52 and a step projection 53 at the lower end thereof. The end portion 50 is provided with a recess 54 slidably to receive the housing member 51, the housing member 51 when slid out into the position shown in Fig. 4 being ready for night use and when slid into the recess 54 of the end portion 50, being moved out of the way for day use.

In Fig. 5 there is illustrated still another form of end member, which is generally designated by the reference character 55. This end member 55 has an end portion 56 which has substantially the same height as that of the end portion 26 illustrated in Fig. 1. In this modification, Fig. 5, however, the end portion 56 is provided with a plurality of recesses, to wit, the two recesses 57 and 58 below which there are formed the step projections 59 and 60 respectively. Below the step projection 60, the end board 56 is recessed as illustrated at 61 having a step projection 62 at its lower end. In the form illustrated in Fig. 5, the step formations are fixed relative to the end member 55 and assume the same position for day use as for night use. However, when the end member 55 is used for instance with the arrangement of berths illustrated in Fig. 1 in place of the end member 63 there illustrated, in order properly to position the step formations 59, 60 and 62 to facilitate access to the upper berth from such step formation, it is desirable slidably to mount the end member 55, for instance on a track 64, the dotted line position illustrated in Fig. 5 showing the position of the end member 55 when in day use and the full line position illustrating the position of the end member 55 when ready for night use.

In Figs. 6 and 7 the berths are illustrated in staggered relation to one another with the upper berths overlapping the lower berths, with which arrangement, the curtains and step formations are provided, according to the present invention, that is, an arrangement of curtains and step formations is provided whereby head room is provided for the lower berth spaced from the upper berth, for use of the occupant of the lower berth in the course of dressing and undressing, and leg room is provided for the occupant of the upper berth, spaced from the lower berth without intruding upon the privacy of either berth.

In Fig. 6 the upper berths 65 are substantially standard in construction, and the arrangement of the seats 66 and 67 and consequently of the compartments usable as lower berths, generally designated by the reference character 68, are also substantially standard in construction, the main difference in the arrangement here shown from the standard construction being that the lower and upper berths are staggered in relation to one another with the upper berths overlapping the lower berths. With the modification illustrated in Figs. 6 and 7, it is also desirable to have the end portions 69 of the end members 70 extend up to the level of the lower edges of the upper berths 65. With this staggered relation, the end portions 69 extend up substantially to the middle of the upper berths and consequently when provided with step formations, the end portions 69 are in proper position for access to the upper berths from the step formations, without providing any movable step formations such as those illustrated and required for the modification illustrated in Fig. 1. The end portions 69 are substantially identical with the end portions 56 of the end members illustrated in Fig. 5, that is provided with two recesses 71 and 72 with step projections 73 and 74 extending from the lower edges of such recesses 71 and 72 respectively, and the end boards 75 of the end members provided with the recesses 76 disposed below the step projections 74 and having step projections 77 extending from the lower edges of the recesses 76.

In this modification, the upper berths are provided with two curtains 78 and 79 which are provided with hooks 80 at their upper ends adapted to be secured to the supporting rods 81 extending along the upper edges of the upper berths 65. The curtains 78 and 79, have the narrow end portions 82 and 83 respectively which form the partitions between the upper berths and the head room for the lower berths. As an instance, the narrow portions 82 and 83 adjacent to one another at adjacent ends of successive upper berths, together form the partitions between such adjacent ends of the upper berths and the head room for the lower berth disposed therebelow. These narrow portions 82 and 83 may be secured in place on the rods 81 more or less tightly, functioning as they do, as partitions. The remaining portions or elongated portions 84 and 85 of the curtains 78 and 79 respectively, however hang loosely, with their lower ends projecting down and extending below the lower edges of the upper berths 65, preferably to form a covering for the leg room of the occupants of the upper compartments. These portions 84 and 85 of a curtain preferably overlap one another and are provided with suitable fastening means such as the buttons 86 cooperating with suitable button holes. It may also be desirable as illustrated in Fig. 6, that suitable fastening means such as buttons 87 be provided on the edge of the upper berths 65 to cooperate with button holes formed in the curtains 78 and 79, in the door flap portions 84 and 85 of the curtains 78 and 79.

The upper berths 65 as illustrated in Fig. 6, preferably have their ends 88 rounded whereby a recess is formed between adjacent rounded portions 88 to form head room for the occupant of the lower berth, such rounded portions 88 cooperating with the partition portions 82 and 83 to form partitions between such head room and the upper berths.

The lower berths are provided with the elongated curtains 89 which are preferably provided with hooks 90 also secured to the rods 81, the curtains 89 as illustrated, extending over the adjacent ends of two successive upper berths, with a half portion of each curtain supported by its hooks 90 overlapping portions of adjacent curtains 78 and 79 of adjacent ends of successive upper berths.

The curtains 89 preferably in width extend from the rear edge of one end portion 69 to the forward edge of the succeeding end portion 69 and in length extend from the rods 81 down to and below the bed portions 91 of the lower berths 68. The curtains 89 are also preferably provided with a slit 92 to provide door flaps for the entrance and egress of the occupants of the lower berths, each slit having an overlapping portion 93 provided with button holes to receive the buttons 94 formed in the portion 95 of the curtain 89 disposed below such overlapping portion 93.

It is obvious that various changes and modifications may be made to the details of construction without departing from the general spirit of the invention as set forth in the appended claims.

I claim:

1. In a car, the combination with a row of upper and lower berth spaces in superposed staggered relation, of berths in said spaces disposed longitudinally of the car with each lower berth overlapped substantially throughout its length by portions of two upper berths, there being a standing space for each upper and for each lower berth disposed adjacent to one another in a row alongside of said berths, the standing space of each upper berth extending down alongside of the side of a lower berth space, the standing space of each lower berth extending up alongside of the sides of two upper berth spaces, and partitions for forming and separating said standing spaces from one another.

2. In a car, the combination with a row of upper and lower berth spaces in superposed staggered relation, of berths in said spaces disposed longitudinally of the car with each lower berth overlapped substantially throughout its length by portions of two upper berths, there being a standing space for each upper and for each lower berth disposed adjacent to one another in a row alongside of said berths, the standing space of each upper berth extending down alongside of the side of a lower berth space, the standing space of each lower berth extending up alongside of the sides of two upper berth spaces, and partitions for forming and separating said standing spaces from one another and for separating the standing spaces of the upper berth spaces from the lower berth spaces and for separating the standing spaces of the lower berth spaces from the upper berth spaces.

3. In a car, the combination with a row of upper and lower berth spaces, of berths in said spaces disposed longitudinally of the car, there being a standing space for each upper and for each lower berth disposed adjacent to one another in a row alongside of said berths, the standing space for each upper berth being disposed therealongside intermediate the ends of the berth and extending down alongside of the side of a lower berth space, the standing space for each lower berth space being disposed therealongside intermediate the ends of the berth and extending up alongside of the side of an upper berth space, and partitions for forming and separating said standing spaces.

4. In a car having an aisle, the combination with a row of upper and lower berth spaces in superposed staggered relation, of berths in said spaces disposed longitudinally of the car with each lower berth overlapped substantially throughout its length by portions of two upper berths, there being a standing space for each upper and for each lower berth disposed adjacent to one another in a row alongside of said berths, the standing space of each upper berth extending down alongside of the side of a lower berth space, the standing space of each lower berth extending up alongside of the sides of two upper berth spaces, each standing space having individual access to said aisle.

5. In a car having an aisle, the combination with a row of upper and lower berth spaces in superposed staggered relation, of berths in said spaces disposed longitudinally of the car with each lower berth overlapped substantially throughout its length by portions of two upper berths, there being a standing space for each upper and for each lower berth disposed adjacent to one another in a row alongside of said berths, the standing space of each upper berth extending down alongside of the side of a lower berth space, the standing space of each lower berth extending up alongside of the sides of two upper berth spaces, and partitions for forming and separating said standing spaces from the aisle.

6. In a car, the combination with a row of upper and lower berth spaces, of a berth in each berth space, the berths in the upper and lower berth spaces extending longitudinally of the car and being in staggered relation to one another with the ends of the berths in the upper berth spaces overlapping the ends of the lower berth spaces, the ends of the upper berth spaces abutting one another and being narrowed to form head rooms, each head room being disposed alongside of a side of an upper berth space for a standing occupant of a lower berth space, and partitions for forming and separating said head rooms from said upper berth spaces.

7. In a car having an aisle, the combination with upper and lower berth spaces, of berths in said berth spaces disposed longitudinally of the car, and partitions each of which separates an upper berth space from the aisle and having a long portion extending materially below the side of the upper berth to conceal the legs of a person standing alongside of the upper berth and a short portion terminating at its lower edge substantially at the level of the side of the upper berth to afford entrance to the lower berth below said short partition portion.

8. In a car having an aisle, the combination with lower berth spaces convertible into day or night use, of means for forming a berth disposed longitudinally of the car in each of said berth spaces or for forming seats in each of said berth spaces with a seat at each end thereof each facing the other, upper berths disposed in staggered relation to said lower berth spaces, there being standing spaces for said upper berths alongside of said seats, and partitions for forming and separating said standing spaces from said seats and from said aisle and spaced apart from one another to afford access from said aisle to the central portions of the lower berth spaces.

9. In a sleeping car, the combination with upper and lower berths, of partitions for said berths, portions of the partitions for the upper berths forming partitions between head room for the lower berths and the upper berths and other portions of the partitions forming doors for the upper berths, and portions of the partitions for the lower berths forming partitions between the leg room for the upper berths and the lower berths, and other portions of the partitions for the lower berths forming doors for the lower berths.

10. In a conveyance, the combination with a row of upper and lower compartments, of a bed in each compartment, the beds in the upper and lower compartments extending longitudinally of the conveyance and being in staggered relation to one another with the ends of the beds in the upper compartments overlapping the beds in the lower compartments, and standing room for each compartment adjacent to each compartment, with the standing room of each upper compartment being adjacent to, and at a different level than the standing room of a lower compartment.

11. In a conveyance, the combination with a row of upper and lower compartments, of a bed in each compartment, the beds in the upper and lower compartments extending longitudinally of the conveyance and being in staggered relation to one another with the ends of the beds in the upper compartments overlapping the beds in the lower compartments, standing room for each compartment adjacent to each compartment, with the standing room of each upper compartment being adjacent to the standing room of a lower compartment, there being an aisle in said conveyance adjacent to said standing room, and partitions for separating the standing room of the compartments from one another and from the aisle.

12. In a conveyance, the combination with a center passageway extending the full length of the conveyance, of upper and lower compartments independent of one another extending longitudinally of the conveyance, the upper and lower compartments in staggered relation to one another, with ends of the upper compartments overlapping ends of the lower compartments, and the level of the standing room for each occupant of an upper compartment when dressing being at a different level than the level of the standing room for the occupant of a lower compartment.

13. In a conveyance, the combination with a center passageway, of upper and lower compartments independent of one another and extending longitudinally of the conveyance, the upper and lower compartments being in staggered relation to one another, with the ends of the upper compartments overlapping the ends of the lower compartments, and movable partitions for shutting off the upper and lower compartments from one another when required for night use.

14. In a car having an aisle, the combination with a row of upper and lower berth spaces in superposed staggered relation, of berths in said spaces disposed longitudinally of the car with each lower berth overlapped substantially throughout its length by portions of two upper berths, there being a standing space for each upper and for each lower berth disposed adjacent to one another in a row alongside of the aisle side of said berth spaces, the standing spaces of said upper berths extending down alongside of the sides of said lower berth spaces, the standing spaces of said lower berth spaces extending up alongside of the sides of said upper berth spaces, partitions for forming and separating said standing spaces from one another, and elevated supports disposed alongside of the sides of said lower berth spaces for standing upon in the standing spaces of said upper berth spaces.

15. In a car having an aisle, the combination with a row of upper and lower berth spaces in superposed staggered relation, of berths in said spaces disposed longitudinally of the car with each lower berth overlapped substantially throughout its length by portions of two upper berths, there being a standing space for each upper and for each lower berth disposed adjacent to one another in a row alongside of said berths, the standing spaces of said lower berth spaces extending up alongside of the sides of the upper berth spaces, the standing spaces of said upper berth spaces extending down alongside of the sides of said lower berth spaces to terminate in a base at a level higher than the floor of the aisle, and partitions for forming and separating said standing spaces from the aisle and affording individual access to said aisle.

16. In a car having an aisle, the combination with a row of upper and lower berth spaces in superposed staggered relation, of berths in said spaces disposed longitudinally of the car with each lower berth overlapped substantially throughout its length by the ends of two upper berths, there being a standing space for each upper and for each lower berth disposed adjacent to one another in a row alongside of said berths, the standing spaces of said lower berth spaces extending up alongside of the sides of the upper berth spaces, the standing spaces of said upper berth spaces extending down alongside of the sides of said lower berth spaces and each having a base at a level higher than the floor of the lower berth spaces, said base to be stood upon by an occupant of an upper berth space, and flexible partitions for independently separating said standing spaces from the aisle to permit occupants thereof to encroach upon said aisle.

17. In a car having an aisle, the combination with lower berth spaces convertible into day or night use, of means for forming a berth disposed longitudinally of the car in each of said berth spaces or for forming seats in each of said berth spaces one seat at each end thereof facing the other, upper berths disposed in staggered relation to said lower berth spaces, there being standing spaces for said upper berths, elevated supports for said standing spaces alongside of said seats, and partitions for forming and separating said standing spaces from said seats and separating said standing spaces from said aisle, said partitions being spaced from one another to afford access from said aisle to the central portions of the lower berth spaces.

18. In a conveyance, the combination of rows of upper and lower sections in superposed staggered relation, said rows of sections being separated to form, and being in individual direct access with, a central aisle, the ends of the upper sections being substantially similarly disposed relative to the centers of the lower sections, the lower sections being each provided with a seat at each end thereof facing each other, each lower section being overlapped by ends of two upper sections at a height above the lower section less than the length of such lower section, and adjacent ends of such upper sections having portions spaced apart from one another so as to provide a head room which extends above the lower part of such adjacent ends.

19. In a conveyance, the combination of rows of upper and lower sections in superposed staggered relation, said rows of sections being separated to form, and being in individual direct access with, a central aisle, the lower sections being each provided with a forwardly and a rearwardly facing double seat disposed back towards back with the seats in the adjacent lower sections, the adjacent ends of two upper sections overlapping said seats at an elevation above the bottom of the lower sections less than the individual length of such lower sections, the lower sections being each provided with a head room extending above and between spaced apart portions of the ends of the upper sections.

20. In a conveyance, the combination of rows of upper and lower sections in superposed staggered relation, said rows of sections being separated to form, and being in individual direct access with, a central aisle, the lower sections being each provided with a seat at each end thereof facing the other end, each lower section being overlapped by ends of two upper sections at a height above the lower section less than the length of a section, and the adjacent ends of such upper sections having portions spaced apart from one another to provide headroom above a portion of the lower sections, the combined overall height of the two sections being less than the combined length of two sections.

21. In a conveyance, the combination of rows of upper and lower sections in superposed staggered relation, said rows of sections being separated to form, and being in individual direct access with, a central aisle, the combined height of said row of upper and lower sections being substantially less than the combined length of two of said lower sections, the ends of the upper sections being similarly disposed relative to the centers of the lower sections, the ends of the upper sections overlapping the lower sections at a height less than a lower section length, and adjacent ends of such upper sections having portions spaced apart from one another to provide additional space above the lower sections and adjacent the aisle for persons in said lower sections.

22. In a conveyance, the combination of rows of upper and lower sections in superposed staggered relation along either side of said conveyance, said rows of sections being separated to form, and being in individual direct access with, a central aisle, the lower sections being each provided with a seat at each end thereof facing the other, the upper sections being disposed above said seats at an elevation higher than the height of the average person seated in such seats but materially lower than the height of the average person standing between such seats, and the portions of the upper sections adjacent said aisle being of materially less length than the center to center length of such sections so that said portions adjacent said aisle are spaced apart from one another to provide room therebetween for the heads of persons of average height passing in or out of said lower sections between said seats to or from said aisle.

23. A conveyance having upper sections provided with downwardly extending leg room and lower sections provided with upwardly extending head room in which the over-all distance from the bottom of the interior of the conveyance to the top of the interior of the conveyance is made materially less than the combined height of a lower section including its head room and an upper section including its leg room by superposing in staggered relation said upper and lower sections, each upper section being arranged to overlap two adjacent lower sections at a height above the lower sections less than the individual length of a lower section, the upper and lower sections being arranged in rows, said rows of sections being separated to form, and being in individual direct access with, a central aisle, the lower sections being each provided with a seat at each end thereof facing each other, and the adjacent ends of the upper sections having portions spaced apart from one another to provide a headroom above the central portion of each lower section between the seats thereof.

24. A conveyance in which upper and lower sections are provided and in which the overall distance from the bottom of the interior of the conveyance to the top of the interior of the conveyance is made materially less than the combined height of two average persons by superposing in staggered relation said upper and lower sections, each upper section being arranged to overlap two adjacent lower sections at a height above the lower section less than the individual height of an average person, the upper and lower sections being arranged in rows, said rows of sections being separated to form, and being in individual direct access with, a central aisle, the lower sections being each provided with a seat at each end thereof facing each other, and the adjacent ends of the upper sections having portions spaced apart from one another to provide a headroom above the central portion of each lower section between the seats thereof.

25. In a conveyance, the combination of rows of upper and lower sections in superposed staggered relation, said rows of sections being separated to form, and being in individual direct access with, a central aisle, the lower sections being each provided with a seat at each end thereof facing the other, each lower section being overlapped by substantially equal portions of two upper sections disposed at an elevation thereabove materially less than sufficient for persons of average height to stand therebeneath but sufficient for such persons to sit in said seats therebeneath, and the adjacent ends of such upper sections having portions thereof spaced apart from one another so as to afford room therebetween for the heads of persons of average height standing between such seats.

26. In a conveyance, the combination of rows of upper and lower sections in superposed staggered relation, said rows of sections being separated to form, and being in individual direct access with, a central aisle, the lower sections being each provided with a seat at each end thereof facing the other, each lower section being positioned substantially centrally relative to the adjacent ends of two upper sections disposed at an elevation thereabove materially less than sufficient for persons of average height to stand therebeneath but sufficient for such persons to sit therebeneath in such seats, and the adjacent ends of said upper sections being spaced apart adjacent said aisle so as to afford room between such adjacent ends for the head of a person of average height standing adjacent said aisle substantially centrally in such lower section.

27. In a conveyance, the combination of a longitudinally extending aisle, a plurality of upper and lower compartments disposed alongside of and in individual access with said aisle, each lower compartment being overlapped by portions of two upper compartments, such overlapping portions being disposed between the floor and ceiling of the conveyance at an elevation sufficient for passengers of average stature to sit therebeneath or thereabove but insufficient for such passengers to stand therebeneath or thereabove, each lower compartment being provided with a forwardly facing seat beneath the overlapping portion of one of said upper compartments and with a rearwardly facing seat beneath the overlapping portion of the other of said upper compartments, such seats facing each other with a space therebetween, each lower compartment being provided with head room extending upwardly of said overlapping portions and disposed above said space for providing standing room between its seats, each upper compartment being provided with leg room extending downwardly of said overlapping portions and disposed adjacent the backs of a forwardly facing seat of one lower compartment and a rearwardly facing seat of another lower compartment for providing standing room for such upper compartment between its end portions, and means including devices disposed upwardly of said seats and alongside the aisle side of the end portions of said upper compartment for restricting occupants from extending their legs transversely of such end portions into said aisle and/or into the seating areas of the seats therebelow.

28. In a conveyance, the combination of a longitudinally extending aisle, a row of upper and lower compartments disposed alongside said aisle, each lower compartment being overlapped by portions of two upper compartments, such overlapping portions being disposed between the floor and ceiling of the conveyance at an elevation sufficient for passengers of average stature to sit therebeneath or thereabove but insufficient for such passengers to stand therebeneath or thereabove, each lower compartment being provided with a forwardly facing seat at the rear thereof beneath the overlapping portion of one of said upper compartments and with a rearwardly facing seat at the front thereof beneath the overlapping portion of the other of said upper compartments, each of said seats extending substantially from the side of the aisle to the side wall of the conveyance for affording seating accommodations for a plurality of passengers facing in the same general direction, each lower compartment being provided with head room extending upwardly of said overlapping portions, such head room being recessed from said aisle into said row of compartments adjacent the end portions of said two upper compartments for providing standing room for such lower compartment between its seats and for facilitating access to and from said aisle as well as for affording passing space for persons meeting one another along said aisle, each upper compartment being provided with leg room extending downwardly of said overlapping portions, such leg room being recessed from said aisle into said row of compartments adjacent the backs of the seats of a forwardly facing seat of one lower compartment and a rearwardly facing seat of another lower compartment for facilitating access between said aisle and such upper compartment and for affording standing room for such upper compartment between its end portions and whereby such standing room is longitudinally spaced from the standing room of each of said lower compartments, portions of said lower compartments alongside of and above the seating areas extending to said aisle intermediate the standing rooms of said upper and lower compartments, and means including devices disposed alongside the aisle side of said intermediate portions both above and below said overlapping portions for spacing occupants of said seats and of said end portions from the aisle.

29. In a conveyance, the combination of a longitudinally extending aisle, a plurality of upper and lower sleeping compartments disposed alongside said aisle, each lower compartment being overlapped by portions of two upper compartments, such overlapping portions being disposed between the floor and ceiling of the conveyance at an elevation sufficient for passengers of average stature to sit therebeneath or thereabove but insufficient for such passengers to stand erect therebeneath or thereabove, berths in said compartments, the berths of the lower compartments being convertible into seats for day use with each lower compartment being provided with a forwardly facing seat at the rear thereof beneath the overlapping portion of one of said upper compartments and with a rearwardly facing seat beneath the overlapping portion of the other of said upper compartments, such seats facing each other in fixed relation with a space therebetween, each lower compartment being provided with head room extending upwardly of said overlapping portions and being disposed above said space for providing standing room for such lower compartment between its seats and for facilitating access with said aisle, each upper compartment being provided with leg room extending downwardly of said overlapping portions and adjacent the backs of the seats of a forwardly facing seat of one lower compartment and the rearwardly facing seat of another lower compartment for affording standing room for such upper compartment between its end portions and for facilitating access with said aisle, and partitions for individually enclosing the upper and lower compartments including their respective standing rooms from said aisle during night use, the partition of each upper compartment having an openable portion in front of its standing room for facilitating access to and from such compartment by way of such standing room and having secured portions laterally thereof and upwardly of each of said seats for restricting such access other than by way of such standing room, the partition of each lower compartment having an openable portion in front of its standing room for facilitating access to and from such compartment by way of such standing room and having secured portions disposed laterally thereof and alongside each of its seats for restricting such access other than by way of such standing room.

30. In a conveyance, the combination of a longitudinally extending aisle, a row of upper and lower sleeping compartments disposed alongside said aisle, each lower compartment being overlapped by portions of two upper compartments, such overlapping portions being disposed between the floor and ceiling of the conveyance at an elevation sufficient for passengers of average stature to sit therebeneath or thereabove but insufficient for such passengers to stand therebeneath or thereabove, berths in said compartments, each berth extending substantially from the side of the aisle to the side wall of the conveyance, the lower compartments being convertible for day use with each lower compartment being provided with a forwardly facing seat at the rear thereof beneath the overlapping portion of one of said upper compartments and with a rearwardly facing seat at the front thereof beneath the overlapping portion of the other of said upper compartments, each of said seats extending substantially from the side of the aisle to the side wall of the conveyance for affording seating accommodations for a plurality of passengers facing in the same general direction, each lower compartment being provided with headroom extending upwardly of said overlapping portions and being recessed from said aisle into said row of compartments adjacent the end portions of said two upper compartments for providing standing room for such lower compartment between its seats and for facilitating access between such compartment and said aisle as well as for affording passing space for persons meeting one another along said aisle, each upper compartment being provided with leg room extending downwardly of said overlapping portions and being recessed from said aisle into said row of compartments adjacent the backs of the seats of a forwardly facing seat of one lower compartment and a rearwardly facing seat of another lower compartment for facilitating access between said aisle and such upper compartment and for affording a standing room for such upper compartment intermediate its end portions whereby such standing room is longitudinally spaced from the standing room of each of said lower compartments, portions of said upper and lower compartments alongside of and above the seating areas of said seats extending to said aisle intermediate the standing rooms of said upper and lower compartments, and partitions for individually enclosing said upper and lower compartments including their respective standing rooms from said aisle during night use, the partition of each lower compartment having a flexible portion in front of its standing room for permitting encroachment thereupon by persons passing one another along said aisle and having secured portions disposed alongside said intervening portions for restricting encroachment either upon said intervening portions or upon said aisle transversely of such intervening portions.

31. In a conveyance, the combination of a longitudinally extending aisle, a row of upper and lower sleeping compartments disposed alongside said aisle, each lower compartment being overlapped by portions of two upper compartments, such overlapping portions being disposed between the floor and ceiling of the conveyance at an elevation sufficient for passengers of average stature to sit therebeneath or thereabove but insufficient for such passengers to stand therebeneath or thereabove, each lower compartment being provided with head room extending upwardly of said overlapping portions and being recessed from said aisle into said row of compartments adjacent the end portions of said two upper compartments for providing standing room for such lower compartment intermediate its end portions and for facilitating access between such compartment and said aisle as well as for affording passing space for persons meeting one another along said aisle, each upper compartment being provided with leg room extending downwardly of said overlapping portions and being recessed from said aisle into said row of compartments adjacent the end portions of two lower compartments for facilitating access between said aisle and such upper compartment and for affording standing room for such upper compartment intermediate its end portions, and partitions for individually enclosing said upper and lower compartments including their respective standing rooms from said aisle during night use, the partition of each lower compartment having a curtain in front of its standing room for permitting encroachment thereupon by persons passing one another along said aisle.

32. The combination with a sleeping car having a longitudinally extending aisle, of a row of sections having upper and lower berth spaces alongside of and in individual access with said aisle, a longitudinally extending berth in each of said spaces, the upper berths being each disposed at an elevation beneath the ceiling of the car insufficient for occupants of average stature to stand between such berths and such ceiling, each of said upper berth spaces being provided with leg room extending downwardly of its berth to a base disposed at a level higher than the floor of said aisle, such leg room and base being recessed from said aisle into its section and confined within the length of the berth spaces of such section disposed adjacent an end portion of its upper berth space for affording standing room therefor and for facilitating access with said aisle laterally of the central portion of the lower berth space therebeneath, such leg room being partitioned from such lower berth space, a curtain separating such upper berth space including its standing room from said aisle, and a partition for partitioning such leg room from said lower berth space, such curtain having a portion terminating at its lower edge at about the level of such upper berth for facilitating access therebeneath between said lower berth space and said aisle and another portion extending below the level of such upper berth for concealing the legs of an occupant of said standing room.

33. The combination with a sleeping car having a longitudinally extending aisle, of a row of sections disposed alongside said aisle, each section comprising an upper and a lower berth space in individual access with said aisle, a longitudinally extending berth in each of said spaces, the upper berth being disposed between the floor and ceiling at an elevation insufficient for persons of average stature to stand therebeneath or thereabove, leg room extending downwardly of such upper berth and alongside the aisle side of said lower berth space for affording standing room for such upper berth space, head room extending upwardly of such upper berth and along the aisle side of such upper berth space for affording standing room for such lower berth space, such standing spaces being disposed laterally of each other alongside said aisle, partitions separating such leg room from such lower berth space and for separating such head room from such upper berth space, and curtains for forming and separating such standing rooms from each other and from the aisle for permitting occupants of such standing rooms to encroach upon said aisle.

34. In a car, the combination of a longitudinally extending row of upper and lower compartments each having a longitudinally disposed berth alongside an aisle, a foot support disposed alongside the aisle side of each lower compartment between the floor of the aisle and the side of an upper berth for affording foot support for a person sitting upon the aisle side of such upper berth with legs dependent therefrom, leg room for said upper compartment extending downwardly thereof alongside the aisle side of said lower compartment to said foot support, head room for said lower compartment extending upwardly thereof above the level of said upper berth along the aisle side of the upper compartment, and partitions forming and enclosing said upper and lower compartments including their respective leg room and head room from each other and from the aisle, such partitions having openable portions for affording said upper and lower compartments independent access with the aisle, the portion of the partitions enclosing the lower compartment including its head room extending downwardly to or below the level of the lower berth for affording privacy thereto from said foot support and from the aisle including the aisle area beneath said leg room and foot support, the openable portion of the partitions affording access to the upper compartment being openable independently of the latter portion for affording access to the upper compartment while enabling said latter portion to maintain the privacy of the lower compartment.

35. In a car, the combination of a longitudinally extending row of sections alongside an aisle, each section having a longitudinally disposed upper berth extending substantially the full length and width of the section and dividing such section into an upper and a lower compartment, such compartments being respectively accessible solely from above and below the aisle side of said upper berth, partitions for said sections, each having secured portions disposed directly along such side of said upper berth and respectively extending directly upwardly and downwardly thereof alongside materially extensive portions of such compartments for confining their respective access to individual entrances disposed respectively above and below different longitudinal portions of said side of the upper berth, a flexible portion bulgeable from said secured portions into the normal area of the aisle for forming a standing space for the upper compartment in front of its entrance and extending downwardly thereof in front of said secured portion alongside the lower compartment, and a flexible portion bulgeable from said secured portions into the normal area of the aisle for forming a standing space for the lower compartment in front of its entrance and extending upwardly thereof in front of a secured portion alongside the upper compartment, such flexible portions cooperating with said secured portions for enclosing said standing spaces including their respective compartments from each other and from the aisle, the major portions of said flexible portions being depressible to positions directly alongside said secured portions for substantially clearing said standing spaces from the normal area of the aisle while cooperating with said secured portions to maintain their respective compartments enclosed, said flexible portions being openable to afford independent access to each compartment through its respective entrance, and each flexible portion being openable independently of the other for affording such access to its respective compartment while enabling the other to be maintained enclosed.

36. In a car, the combination of a longitudinally extending row of sections alongside an aisle, each section having a longitudinally disposed upper berth extending substantially the full length and width of the section and dividing such section into an upper and a lower compartment, partitions for each section having secured portions along respectively different longitudinal portions of the aisle side of the upper and the lower compartments for restricting their respective access to individual entrances disposed along respectively different longitudinal portions of the aisle side of the section, such secured portions being disposed in a substantially vertical position directly along the aisle side of the upper berth for conservation of space between said berth and the normal area of the aisle, a flexible portion bulgeable from said secured portions into the normal area of the aisle for forming a standing space for the upper compartment in front of its entrance and extending downwardly thereof in front of a secured portion alongside the lower compartment, an elevated foot support disposed beneath said entrance in front of said latter secured portion for standing upon in said standing space, and a flexible portion bulgeable from said secured portions into the normal area of the aisle for forming a standing space for the lower compartment in front of its entrance and extending upwardly thereof in front of a secured portion alongside the upper compartment, said flexible portions cooperating with said secured portions for enclosing said standing spaces including their respective compartments from each other and from the aisle, and for partitioning said elevated foot support from the lower compartment and its standing space, said flexible portions being bulgeable from said secured portions into the normal area of the aisle independently of each other for individually enclosing each standing space from the other as well as from the aisle, the major portion of each flexible portion being depressible to a position directly alongside said secured portions for individually substantially clearing a standing space from the normal area of the aisle while cooperating with said secured portions to maintain such standing space and its respective compartment enclosed.

37. In a car, the combination of a longitudinally extending row of convertible sections alongside an aisle, each section having a longitudinally disposed upper berth dividing such section into an upper and a lower compartment, such lower compartment having a longitudinally disposed lower berth when converted for night use and having a pair of confronting seats each within an end portion thereof when converted for day use, each section being provided with end members alongside the end portions of the aisle side thereof for partitioning said seats and end portions from the aisle, such end members being spaced apart centrally of the lower compartment for affording access thereto between its seats, one of said end members terminating upwardly along at least a portion thereof at about the level of the upper berth for affording access to the upper compartment above said portion of the end member, means for facilitating access to said upper compartment disposed along the aisle side of said end member, a standing space for said upper compartment communicating therewith above said end member and extending downwardly along the aisle side of said end member, a standing space for said lower compartment communicating therewith between said end members and extending upwardly along the aisle side of the upper compartment, and partitions cooperating with said end members for forming and enclosing said standing spaces including their respective compartments from each other and from the aisle, and for enclosing the lower compartment including its standing space from said means for facilitating access to the upper compartment, such partitions having openable portions for affording the upper and lower compartments independent access with the aisle, each portion affording access to one compartment being openable independently of the portions enclosing the other compartment and respective standing space.

38. In a car, the combination of a longitudinally extending row of convertible sections alongside an aisle, each section having a longitudinally disposed upper berth dividing such section into an upper and a lower compartment, such lower compartment having a longitudinally disposed lower berth when converted for night use and having a forwardly facing seat within its rear portion and a rearwardly facing seat within its front portion when converted for day use, the aisle side of such sections being provided with end members, each partitioning the aisle from a forwardly facing seat and a rearwardly facing seat of adjoining sections, such end members being spaced apart along the central portion of each section for affording an entrance to the lower compartment midway between its seats, each end member having a movable portion terminating upwardly along at least a portion thereof at about the level of the side of the upper berth for affording an entrance to the upper compartment above such portion and having a fixed portion extending alongside an adjoining section, and means for establishing a standing space for the upper compartment in front of its entrance and extending downwardly thereof along the aisle side of the lower compartment and partitioned therefrom by said movable portion of the end member and for establishing a standing space for the lower compartment in front of its entrance and extending upwardly thereof along the aisle side of the upper compartment, such means having partitions cooperating with said end members for enclosing said standing spaces including their respective compartments and entrances from each other and from the aisle, such partitions having openable portions for affording independent access to said upper and lower compartments through their respective entrances, such openable portions and certain other portions being movable to disestablish said standing spaces and to expose the section to the aisle, and said movable portion of the end member being movable to a position alongside said fixed portion alongside the adjoining section to afford the former section additional exposure to the aisle.

39. In a car, the combination of a longitudinally extending aisle alongside a plurality of longitudinally disposed upper berths substantially abutting one another, a plurality of upper and lower compartments respectively above and below said upper berths, standing spaces for said compartments extending longitudinally wholly alongside the aisle side of said berths, the standing space for each upper compartment extending downwardly thereof alongside a lower compartment, the standing space for each lower compartment extending upwardly thereof alongside an upper compartment, and partitions forming and enclosing said upper and lower compartments including their respective standing spaces from each other and from the aisle, such partitions having flexible portions for the individual expansion and contraction of each standing space into and out of the normal area of the aisle, the standing spaces of an upper compartment and a lower compartment having an aggregate longitudinal width alongside an upper berth materially less than the length of such berth, the portion of the partitions along the remaining length of such berth maintaining a substantially normal area to the aisle therealongside.

40. In a car, the combination of a longitudinally extending row of sections alongside an aisle, each section having a longitudinally disposed upper berth extending substantially the full length and width of the section and dividing such section into an upper and a lower compartment, a standing space for the lower compartment extending upwardly thereof alongside the upper compartment and being disposed along the central portion of the aisle side of the section and spaced from the ends thereof, a standing space for the upper compartment extending downwardly thereof alongside the lower compartment and being disposed along an end portion of the aisle side of the section, and partitions forming and enclosing said compartments including their respective standing spaces from each other and from the aisle, such partitions having flexible portions for the individual expansion and contraction of each standing space into and out of the normal area of the aisle, the portion of the partitions along the other end portion of the aisle side of the section maintaining a substantially normal area to the aisle therealongside.

41. In a car, the combination of a longitudinally extending row of upper and lower compartments alongside an aisle, each upper compartment having a longitudinally disposed upper berth, each lower compartment being convertible, having a longitudinally disposed lower berth when converted for night use and having a pair of confronting seats when converted for day use, such seats being spaced apart materially forwardly and rearwardly of the center of the lower compartment for affording adequate leg room therebetween, standing room for each lower compartment disposed along the aisle side thereof extending materially forwardly and rearwardly of the center of such section for convenience of communication with such compartment midway between its seats and extending upwardly along the aisle side of an upper compartment, a foot support disposed along the aisle side of each lower compartment between the floor of the aisle and the side of an upper berth for affording foot support for a person sitting on the aisle side of such upper berth with legs dependent therefrom, leg room for each upper compartment extending downwardly thereof along the aisle side of a lower compartment to said foot support, such leg room and foot support being disposed along an end portion of the aisle side of the lower compartment and spaced from the center of such side for affording clearance for the standing room of said lower compartment, and partitions forming and enclosing said upper and lower compartments including their respective standing rooms and leg rooms from each other and from said aisle and for enclosing the lower compartments including their respective standing spaces from said foot supports.

42. In a car, the combination of a longitudinally extending row of convertible sections alongside an aisle, each section having a longitudinally disposed upper berth extending substantially the full length and width of the section and dividing such section into an upper and a lower compartment, such lower compartment having a longitudinally disposed lower berth when converted for night use and having a pair of confronting seats each within an end portion thereof when converted for day use, partitions for said sections, each having secured portions alongside the end portions of the aisle side of the lower compartment for partitioning said seats and end portions of the section from the aisle, such secured portions being spaced apart centrally of the lower compartment for affording an entrance thereto midway between its seats, a secured portion alongside the central and an end portion of the aisle side of the upper compartment and spaced from the other end thereof for affording an entrance thereto above one of the secured portions alongside the lower compartment, such secured portions being disposed in a substantially vertical position directly along the aisle side of the upper berth for conservation of space between said berth and the normal area of the aisle, a flexible portion bulgeable from said secured portions into the normal area of the aisle for establishing a standing space for the lower compartment in front of its entrance and extending upwardly thereof in front of said secured central portion alongside the upper compartment, and a flexible portion bulgeable from said secured portions into the normal area of the aisle for establishing a standing space for the upper compartment in front of its entrance and extending downwardly thereof in front of a secured end portion alongside the lower compartment, said flexible portions cooperating with said secured portions for enclosing said standing spaces including their respective compartments from each other and from the aisle, the major portion of each flexible portion being depressible to a position directly alongside a secured portion for substantially clearing a standing space from the normal area of the aisle while cooperating with the other flexible portion and said secured portions to maintain their respective compartments enclosed, such flexible portions being openable to afford independent access to said compartments through their respective entrances, each flexible portion being openable independently of the other for affording access to its respective compartment while enabling the other compartment to be maintained enclosed.

43. In a car having a longitudinal aisle, the combination of a row of lower compartments superposed by a row of individually openable and closable upper berths, such berths when open or closed respectively decreasing or increasing the head room of the lower compartments therebeneath, each lower compartment having means for alternately forming either a lower berth or a pair of confronting seats, each beneath an end portion of an upper berth, each upper berth when open and ready for use having a foot support between the central portion of the aisle side thereof and the floor of the aisle at an elevation suitable for supporting the feet of a person sitting upon said central portion of the berth with legs dependent therefrom, such foot support being individual to said upper berth and being disposed directly alongside the aisle side of a lower compartment in anchored relation to said upper berth during night use thereof, such upper berth also having devices disposed upwardly of the aisle side thereof for preventing dislodgement therefrom of a reclining occupant, such devices having secured portions each extending above an end portion of the aisle side of such berth and in engagement therewith to prevent occupants thereof from extending their legs therefrom into the seating areas of the seats therebelow, such secured portions being spaced apart above said foot support for affording space for said person to sit on said central portion of the berth with legs dependent to said foot support, such devices being movable to enable said upper berth to be closed.

TRIMBLE DE ROODE.